United States Patent [19]

Kurimoto et al.

[11] Patent Number: 5,618,974
[45] Date of Patent: Apr. 8, 1997

[54] CATALYST FOR PRODUCTION OF METHACRYLIC ACID AND METHOD FOR PRODUCTION OF METHACRYLIC ACID BY THE USE OF THE CATALYST

[75] Inventors: Ikuo Kurimoto; Hideo Onodera; Yukio Aoki, all of Hyogo, Japan

[73] Assignee: Nippon Shokubai Co., Ltd., Osaka-fu, Japan

[21] Appl. No.: 456,061

[22] Filed: May 31, 1995

[30] Foreign Application Priority Data

May 31, 1994 [JP] Japan ................................ 6-118227

[51] Int. Cl.$^6$ ........................................ B01J 27/16
[52] U.S. Cl. ................... 562/532; 562/531; 562/535; 502/211; 502/212; 502/209; 502/220
[58] Field of Search ..................... 562/532, 531, 562/535; 502/211, 212, 209, 220

[56] References Cited

U.S. PATENT DOCUMENTS

| 5,153,162 | 10/1992 | Kurimoto et al. | 502/209 |
| 5,330,954 | 7/1994 | Cadot et al. | 502/209 |

FOREIGN PATENT DOCUMENTS

| 0415347 | 8/1990 | European Pat. Off. . |
| 0427508 | 11/1990 | European Pat. Off. . |
| 51108016 | 3/1975 | Japan . |
| 552619 | 6/1978 | Japan . |
| 5940056 | 8/1979 | Japan . |
| 596181 | 8/1979 | Japan . |
| 57171443 | 4/1981 | Japan . |
| 1288339 | 5/1988 | Japan . |
| 5293375 | 4/1992 | Japan . |

OTHER PUBLICATIONS

"Solid Suferacid in This Decade," Kazushi Araki, 1989.
European Search Report, EP 95 10 8271, Nov. 3, 1995.
Recent Progress in Solid Superacid, Applied Catalysis, 61 (1990) 1–25.
Yamaguchi, "Recent Progress in Solid Superacid", pp. 1–25.

Primary Examiner—Margaret W. Glass
Attorney, Agent, or Firm—Omri M. Behr, Esq.

[57] ABSTRACT

A catalyst for the production of methacrylic acid by the vapor-phase catalyst oxidation and/or oxidative dehydrogenation of at least one compound selected rom the group consisting of methacrolein, isobutyl aldehyde, and isobutyric acid and a method for the production of methacrylic acid by the use of this catalyst are provided. The catalyst of this invention comprises (A) a composite oxide having Mo and P as essential components and used for the production of methacrylic acid by vapor-phase catalytic oxidation and/ or oxidative dehydrogenation of methacrolein, isobutyl aldehyde, and/or isobutyric acid and (B) a solid acid having acid strength (Ho) of not more than −11.93. Since this catalyst excels in catalytic activity and service life, it allows methacrylic acid to be produced stably at a high yield for a long time.

12 Claims, No Drawings

CATALYST FOR PRODUCTION OF METHACRYLIC ACID AND METHOD FOR PRODUCTION OF METHACRYLIC ACID BY THE USE OF THE CATALYST

BACKGROUND OF THE INVENTION

Field of the Invention

This invention relates to a catalyst for the production of methacrylic acid and a method for the production of methacrylic acid by the use of this catalyst. More particularly, it relates to a catalyst for producing methacrylic acid stably at a high yield for a long time by the vapor-phase catalytic oxidation or vapor-phase catalytic oxidative dehydrogenation of at least one compound selected from the group consisting of methacrolein, isobutyl aldehyde, and isobutyric acid and a method for the production of methacrylic acid by the use of this catalyst.

Description of the Prior Art

Various improved catalysts have been proposed for efficient production of methacrylic acid by the vapor-phase catalytic reaction such as of methacrolein. For example, JP-A-57-171,443 discloses a catalyst using Mo, P, (and at least one element selected among Na, K, Rb, Cs, and Tl) as essential components, JP-A-55-2,619 a catalyst using Mo, V, P, (and at least one element selected among K, Rb, Cs, and Tl) as essential components, and JP-A-51-108,016 a catalyst using Mo, P, (at least one element selected among K, Rb, Cs, and Tl), (and at least one element selected among Rh, Ce, and Zr) as essential components. Most of these known catalysts have molybdenum and phosphorus as main components thereof. In the light of their methods of preparation, they are structurally construed as mixtures comprising phosphomolybdic acid or salts thereof such as, for example, ammonium salt and alkali metal salt and having the structure of a heteropoly acid or a heteropoly acid salt.

The problem confronting these catalysts resides in the fact that they are considered to be still deficient not only in the yield of methacrylic acid but also in the service life of the catalysts. Since heteropoly acids are vulnerable to heat, the catalysts after a protracted use show a sign of decomposition of the heteropoly acid structure. For the sake of obtaining a catalyst for the production of methacrylic acid which manifests the function thereof stably for a long time, therefore, it is necessary that the stability of heteropoly acid be enhanced or a highly active heteropoly acid catalyst usable at relatively low temperatures be realized.

Solid acids whose magnitudes of acid strength (Ho) (hereinafter referred to simply as "acid strength" or occasionally as "Ho" ) are not more than −11.93 are generally called solid super acids as introduced in detail in "SHOKUBAI" Vol 31, No 7 (1989), pp 512 through 518, for example. According to the literature, the super acid is defined as an acid possessing acidity stronger than that of 100% sulfuric acid (Ho≦−11.93) and is reported to be usable under more moderate conditions than the ordinary acid catalysts in such reactions as decomposition, isomerization, alkylation, polymerization, acylation, dehydration, and dehydrogenation of hydrocarbon which are referred to as acid catalyst reactions. The fact that this super acid, particularly when combined with a heteropoly acid catalyst, is effective in inducing the vapor-phase catalytic oxidation reaction for producing corresponding species of methacrylic acid from methacrolein and isobutyl aldehyde has not been known at all to the art.

One object of this invention, therefore, is to provide a catalyst for producing methacrylic acid at a high yield.

Another object of this invention is to provide a catalyst for the production of methacrylic acid which excels in terms of service life and permits stable operation of the catalytic reaction for a long time.

Still another object of this invention is to provide a catalyst for the production of methacrylic acid which, even in a high-load operation aimed at high productivity, permits this operation to proceed stably for a long time.

Yet another object or this invention is to provide a method for producing methacrylic acid efficiently by the use of the catalyst for the production of methacrylic acid mentioned above.

SUMMARY OF THE INVENTION

The objects mentioned above are accomplished by a catalyst for producing methacrylic acid by the oxidation and/or oxidative dehydrogenation of at least one compound selected from the group consisting of methacrolein, isobutyl aldehyde, and isobutyric acid in a vapor phase with a molecular oxygen-containing gas, which catalyst comprises (A) a composite oxide having molybdenum and phosphorus as essential components and adapted for the production of methacrylic acid by the vapor-phase catalytic oxidation and/or oxidative dehydrogenation of methacrolein, isobutyl aldehyde, and isobutyric acid and (B) a solid acid having acid strength (Ho) of not more than −11.93 (Ho≦−11.93).

These objects are further accomplished, in the vapor-phase catalytic oxidation reaction for producing methacrylic acid by the oxidation and/or oxidative dehydrogenation of at least one compound selected from the group consisting of methacrolein, isobutyl aldehyde, and isobutyric acid in the vapor phase with the molecular oxygen-containing gas, by a method for the production of methacrylic acid which effects the reaction in the presence of the catalyst for the production of methacrylic acid mentioned above.

We have learnt that a catalyst composition which combines a known composite oxide having molybdenum and phosphorus as essential components and catalyzing the production of methacrylic acid with a solid acid having acid strength of not move than −11.93 possesses high activity and excels in stability and that the objects mentioned above can be attained by using this catalyst composition. We have perfected this invention on the basis of this knowledge.

Since the catalyst of this invention maintains high activity, it aids in the production of methacrylic acid at a high yield.

Since the catalyst of this invention excels in terms of service life and maintains this outstanding quality for a long time, it permits methacrylic acid to be produced stably for a long time. Even after a protracted use, this catalyst can continue the reaction for the production of methacrylic acid at the same degree of yield as during the initial stage of the reaction without appreciably increasing the reaction temperature. Since the catalyst of this invention exhibits high activity even at low temperatures, it aids in effecting the reaction at the same degree of yield at reaction temperatures lower than those necessary for the conventional method.

Since the catalyst of this invention suffers no degradation of catalytic property even under high-load operation conditions aimed at high productivity, it permits methacrylic acid to be produced stably with high operational efficiency for a lone time.

By the method of this invention, methacrylic acid can be produced efficiently and advantageously on a commercial scale.

DESCRIPTION OF THE PREFERRED EMBODIMENT

Now, this invention will be described in detail below.

Component (A)

As the component (A), any of the well-known composite oxides which have molybdenum and phosphorus as essential components and are used for producing methacrylic acid by the vapor-phase catalytic oxidation and/or oxidative dehydrogenation of at least one compound selected from the group consisting of methacrolein, isobutyl aldehyde, and isobutyric acid can be used. In these composite oxides, those composite oxides which are represented by the following general formula (1):

$$Mo_aP_bA_cB_dC_eD_fO_x$$

wherein Mo is molybdenum, P is phosphorus, A is at least one element selected from the group consisting of arsenic, antimony, germanium, bismuth, zirconium, cerium, and selenium, B is at least one element selected from the group consisting of copper, iron, chromium, nickel, manganese, cobalt, tin, silver, zinc, palladium, rhodium, and tellurium, C is at least one element selected from the group consisting of vanadium, tungsten, and niobium, D is at least one element selected from the group consisting of alkali metals, alkaline earth metals, and thallium, O is oxygen, and a, b, c, d, e, f, and x is atomic ratios respectively of Mo, P, A, B, C, D, and O such that b is a numeral in the range of 0.5 to 4, preferably 0.5 to 3, c in the range of 0 to 5, preferably 0.01 to 3, d in the range of 0 to 3, preferably 0.01 to 2, e in the range or 0 to 4, preferably 0.01 to 3, f in the range or 0.01 to 4, preferably 0.01 to 3, and x is a numeral to be determined by the oxidized states of the elements when a is fixed at 12, are advantageously used.

These composite oxides are not discriminated on account of their methods of preparation. They may be prepared by any of the well-known methods. The compound containing the relevant elemental component as a starting material is not particularly limited by its kind. Any of the oxides which contain the relevant elemental component or the compounds which produce the oxides when calcined can be used. As typical examples of the compounds which produce the oxides when calcined, hydroxides, metallic acids, nitrates, carbonates, ammonium salts, acetates, and formates may be cited. The compound which contains two or more elemental components is likewise usable. As typical examples of the compound containing molybdenum, molybdenum trioxide, ammonium paramolybdate, molybdio acid, phosphomolybdic acid, and phosphovanadomolybdic acid may be cited. As typical examples of the compound containing phosphorus, orthophosphoric acid, metaphosphoric acid, phosphorous acid, primary ammonium phosphate, and secondary ammonium phosphate may be cited.

Generally, the composite oxide of the component (A) is obtained by suitably dissolving compounds containing relevant elemental components in required amounts in an aqueous medium, for example, heating and stirring them in the medium, then evaporating the resultant liquid mixture to dryness, and further pulverizing the resultant dry mixture when necessary.

Component (B)

The solid super acid as the component (B) is known, as remarked in the literature "SHOKUBAI" mentioned above, in two kinds, sulfuric acid-carried super acid and oxide-carried super acid. As typical examples of these kinds, the following super acids (1) through (7) may be cited.

(1) Super acids of $SO_4$/oxide of a metal of Group IV in the Periodic Table of elements:

In the metals of Group IV in the Periodic Table of elements, zirconium, titanium, tin, and hafnium are favorably used. These metals may be used in the form of a mixture of two or more members. As typical examples of the super acids of this category, $SO_4$/zirconium oxide, $SO_4$/titanium oxide, $SO_4$/tin oxide, and $SO_4$/hafnium oxide may be cited. They are represented as $SO_4/ZrO_2$, $SO_4/TiO_2$, $SO_4/SnO_2$, and $SO_4/HfO_2$ respectively. These super acids are dealt with in such publications as "Advances in Catalysis", Vol. 37, pp. 182–191 (1990) and "Applied Catalysis", Vol. 61, pp. 1 to 25 (1990) besides "SHOKUBAI" mentioned above.

The method for the preparation of these super acids will be explained below with respect to zirconium as an example. The $SO_4$/zirconium oxide super acid is obtained by combining zirconium hydroxide or amorphous zirconium oxide with a sulfate ion-containing solution such as, for example, sulfuric acid or an aqueous sulfuric acid solution, then removing an excess of the sulfate ion-containing solution, subsequently drying the resultant wet mixture, and calcining the dry mixture in the atmosphere of an inert gas such as air or nitrogen at a temperature in the range of 350° to 800° C., preferably 400° to 700° C. for a period in the approximate range of 1 to 10 hours, preferably 2 to 8 hours. The super acid of other metal can be prepared by following this procedure while using the hydroxide or amorphous oxide of the metal instead.

It is generally held that, in the super acid which is obtained as described above, the sulfate ion ($SO_4^{2-}$) is bound to or carried on a metal oxide. This super acid is expressed as $SO_4$/metal oxide ($MeO_x$) in the publications "SHOKUBAI" and "Advances in Catalysis" mentioned above. The super acids which are used in the present invention, therefore, will be expressed after this manner.

(2) $SO_4$/iron oxide super acid:

This super acid is expressed as $SO_4/Fe_2O_3$ and is dealt with in the publications of "SHOKUBAI" and "Advances in Catalysis" and in "Chemistry Letters", pp. 1259 to 1260 (1979) as well.

This super acid is obtained by combining the hydroxide or amorphous oxide of iron with a sulfate ion-containing solution such as, for example, sulfuric acid or an aqueous sulfuric acid solution, then removing an excess of the sulfate ion-containing solution from the resultant liquid mixture, then drying the wet mixture, and calcining the dry mixture in the atmosphere of an inert gas such as air or nitrogen gas at a temperature in the range of 350° to 800° C., preferably 400° to 650° C. for a period in the approximate range of 1 to 10 hours, preferably 2 to 8 hours.

(3) $SO_4$/silicon oxide super acid:

This super acid is expressed as $SO_4/SiO_2$ and dealt with in the publications of "SHOKUBAI" and "Advances in Catalysis".

This super acid is obtained by combining silica gel with a sulfur-containing compound such as, for example, sulfuryl chloride, then drying the resultant liquid mixture, and subsequently calcining the dry mixture in the atmosphere of an inert gas such as air or nitrogen gas at a temperature in the range of 300° to 600° C., preferably 350° to 500° C. for a period in the approximate range of 1 to 10 hours, preferably 2 to 8 hours.

(4) SO$_4$/aluminum oxide super acid:

This super acid is expressed as SO$_4$/Al$_2$O$_3$ and dealt with in the publications of "SHOKUBAI" and "Advances in Catalysis".

This super acid is obtained by combining γ-alumina or aluminum hydroxide with a sulfate ion-containing solution such as, for example, sulfuric acid or an aqueous sulfuric acid solution, removing an excess of the sulfate ion-containing solution, then drying the resultant wet mixture, and subsequently calcining the dry mixture in the atmosphere of an inert gas such as air or nitrogen gas at a temperature in the range of 350° to 800° C. preferably 400° to 700° C. for a period in the approximate range of 1 to 10 hours, preferably 2 to 8 hours.

(5) Tungsten oxide, molybdenum oxide, or tungsten-molybdenum complex oxide/zirconium oxide super acid:

These super acids are expressed as WO$_3$/ZrO$_2$, MoO$_3$/ZrO$_2$, and WO$_3$-MoO$_3$/ZrO$_2$ and dealt with in the publications of "SHOKUBAI", "Chemistry Letters", and "Advances in Catalysis" and in "J. Chem. Soc. Chem. Commun.", pp. 1059 to 1060 (1988) as well.

These super acids are obtained by depositing a compound of tungsten and/or molybdenum on zirconium hydroxide or amorphous zirconium oxide and then calcining the resultant composite in the atmosphere of an inert gas such as air or nitrogen gas at a temperature in the range of 500° to 1000° C., preferably 650° to 850° C. for a period in the approximate range of 1 to 10 hours, preferably 2 to 8 hours.

The amount of tungsten oxide, molybdenum oxide, or tungsten-molybdenum complex oxide to be deposited is generally in the range of 1 to 40% by weight, preferably 3 to 40% by weight, based on the amount of zirconium oxide.

(6) Super acid of tungsten oxide/tin oxide, titanium oxide, iron oxide, or complex oxide of at least two elements selected among tin, titanium, and iron:

These super acids are expressed as WO$_3$/SnO$_2$, WO$_3$/TiO$_2$, WO$_3$/Fe$_2$O$_3$, WO$_3$/SnO$_2$-TiO$_2$, WO$_3$/SnO$_2$-Fe$_2$O$_3$, WO$_3$/TiO$_2$-Fe$_2$O$_3$, and WO$_3$/SnO$_2$-TiO$_2$-Fe$_2$O$_3$ and dealt with the publication of "SHOKUBAI" and in "Stud. Surf. Soc. Catal. J", Vol. 75, pp. 2613 to 2616 (1953) as well.

These super acids are obtained by depositing a tungsten compound on at least one compound selected from the group consisting of stannic hydroxide, amorphous stannic oxide, titanium hydroxide, amorphous titanium oxide, ferric hydroxide, and amorphous ferric oxide and then calcining the resultant composite in the atmosphere of an inert gas such as air or nitrogen gas at a temperature in the range of 650° to 1200° C. preferably 650° to 1000° C. for a period in the approximate range of 1 to 10 hours, preferably 2 to 8 hours.

The amount of tungsten oxide to be carried is generally in the range of 1 to 40% by weight, preferably 3 to 40% by weight, based on the amount of the oxide such as tin oxide or titanium oxide.

(7) Super acid of phosphotungstic acid and/or alkali metal salt thereof:

These super acids are expressed as H$_3$P$_1$W$_{12}$O$_{40}$ and H$_{3-x}$A$_x$P$_1$W$_{12}$O$_{40}$, wherein A is an alkali metal (sodium, potassium, rubidium, and/or cesium) and x is above 0 and below 3 (0<x<3) These super acids are dealt with in "Chem. Tech.", November (1993), pp. 28 to 29.

These super acids are obtained by calcining phosphotungstic acid or alkali salts thereof in the atmosphere of an inert gas such as air or nitrogen gas at a temperature in the range of 350° to 500° C. preferably 380° to 450° C., for a period in the approximate range of 1 to 10 hours, preferably 2 to 8 hours.

As the component (B) of this invention, two or more of the various super acids mentioned above may be used in a combined form.

Some of the solid acids to be used as the component (A) show degrees of acid strength of not more than −16.04 (Ho ≤−16.04). These degrees cannot be definitely determined, however, because no method has yet been established for determining acid strength stronger than −16.04. The super acids (1) through (7) mentioned above invariably show degrees of acid strength stronger than −11.93 and, therefore, can be effectively used as the component (B) of this invention.

The acid strength in this invention has been determined by the following method which is now in general use.

When a sample subjected to the determination is white, this sample is immersed in benzene and a benzene solution containing an acid-base indicator of a known pKa value is added thereto. The sample is kept under observation until the indicator on the surface of the sample assumes the color of acidity. The smallest value of pKa at which the color of acidity is assumed is reported as the acid strength of the sample.

The indicators (pKa) which are usable for this determination include m-nitrotoluene (−12.0), p-nitrotoluene (−12.4), p-nitro-chlorobenzene (−12.7), m-nitrochlorobenzene (−13.2), 2,4-dinitro-toluene (−13.8), 2,4-dinitrofluorobenzene (−14.5), and 1,3,5-trinitrobenzene (−16.0), for example.

When a given sample has a color, the sample is first placed in a container provided with a gas inlet and a gas outlet line. Then the container holding the sample is evacuated until thorough expulsion of the entrapped air and ammonia gas is introduced into the container and adsorbed on the sample. Then, the ammonia gas is gradually discharged from the container and meanwhile the temperature of the container is gradually elevated. The ammonia gas discharged at a varying level of the container temperature is collected with liquefied nitrogen. The amount of ammonia thus collected is determined on the weight of the sample. By rating this amount with the aid of a calibration curve separately obtained with samples of known degrees of acid strength, the acid strength of the sample is calculated.

Catalyst:

The catalyst of this invention contains the component (A) and the component (B) mentioned above. The amount of the component (B) based on the weight of the component (A) is generally in the range of 0.5 to 30% by weight, preferably 1 to 20% by weight. If the amount of the component (B) is less than 0.5% by weight, the effect of the addition of this component (B) will not be satisfactorily obtained. Conversely, if the amount exceeds 30% by weight, the activity of the catalyst will be found to decrease, the selectivity to methacrylic acid from methacrolein etc. will be unduly small, and the selectivity to CO$_2$ and CO will be unduly large. To be specific, when a component (B) is used singly, a reaction of forming CO$_2$ and CO is easily carried out because the conversion of methacrolein etc. and the selectivity to methacrylic acid are unduly low. The component (B), therefore, is a component to be disadvantageously used singly in the vapor-phase catalytic oxidation reaction according to this invention.

It, however, was demonstrated that by introducing a component (B) into a component (A), the activity and the selectivity to methacrylic acid from methacrolein etc. by the use of the component (A) are improved. Particularly when a component (B) is introduced into a component (A) in such a proportion as mentioned above, the component (B) can prominently manifest its effects as a cocatalyst.

The catalyst of this invention can be used all by itself. Optionally, it may be used as deposited on an inert carrier such as, for example, alumina, silica-alumina, silicon carbide, titanium oxide, magnesium oxide, or aluminum sponge. In this case, the deposited catalyst may incorporate therein such glass fibers as inorganic fibers or various whiskers which are widely known to permit effective improvement of the strength and the attrition loss of the catalyst. Further, for the purpose of controlling the physical properties of the catalyst with high repeatability, such additives as ammonium nitrate, cellulose, starch, polyvinyl alcohol, and stearic acid which are generally known as powder binders may be used.

The catalyst is not particularly discriminated on account of its shape. It may be in any desired shape such as, for example, pellets, beads, cylinders, rings, and tablets. The average diameter of the catalyst particles is generally in the range of 1 to 15 mm, preferably 3 to 10 mm.

The catalyst which contains the component (A) and the component (B) is not particularly discriminated on account of the method adopted for its preparation. It can be prepared by any desired method. For example, the method which comprises first preparing the components each in a powdery form and then mixing them homogeneously by the use of a ball mill and the method which comprises causing the component (B) prepared in advance to be dispersed in the component (A) at any desired stage during the preparation of the component (A) may be adopted.

Generally, after the component (A) and the component (B) have been thoroughly mixed, the resultant mixture optionally combined with water as a molding auxiliary is molded in a desired shape and the molded mixture is calcined under a stream of air at a temperature in the range of 300° to 600° C., preferably 350° to 500° C., for a period in the approximate range of 1 to 10 hours, preferably 2 to 8 hours. Thus, the catalyst is used in a molded form. Vapor-phase catalytic oxidation or oxidative dehydrogenation reaction:

The vapor-phase catalytic oxidation reaction of this invention is not particularly discriminated on account of the apparatus and the operating conditions to be adopted. As respects the reaction conditions, the vapor-phase catalytic oxidation or vapor-phase catalytic oxidative dehydrogenation of methacrolein, isobutyl aldehyde, or isobutyric acid or a mixture thereof can be carried out under such conditions as are generally adopted for the production of methacrylic acid by the reaction mentioned above.

For example, a mixed gas comprising of 1 to 10% by volume, preferably 2 to 8% by volume of at least one raw material compound selected from the group consisting of methacrolein, isobutyl aldehyde, and isobutyric acid and 1 to 10 times, preferably 1 to 8 times its volume of molecular oxygen and an inert gas such as nitrogen, carbon dioxide, or steam serving as a diluent (particularly, the use of steam is advantageous in repressing the formation of by-products and enhancing the yield of the product aimed at) is brought into contact with the catalyst of this invention at a temperature in the range of 200° to 400° C., preferably 250° to 350° C., under a pressure in the range of normal pressure to 10 atmospheres, preferably normal pressure to 8 atmospheres, at a space velocity in the range of 100 to 5,000 $hr^{-1}$ (STP), preferably 500 to 4,000 $hr^{-1}$ (STP).

When methacrolein is used as the raw material compound, it does not need to be pure. A methacrolein-containing gas which is obtained by catalytic reaction of isobutylene, t-butanol, or methyl-t-butyl ether may be used instead. The use of this methacrolein-containing gas is particularly recommended in a commercial process.

Function:

The solid super acid which is highly effective in the acid catalytic reaction also manifests activity in the oxidation reaction. Indeed, the oxidation of butanes to CO and $CO_2$, the formation of acetaldehyde and acetone from ethylene, and the formation of cyclohexanone from cyclohexanol have been known to the art. Nevertheless, the fact that the solid super acid is also effective in the oxidation reaction resulting in the formation of methacrylic acid has never been known to date.

The function of the component (B) in the catalyst of this invention has not yet been fully elucidated. It is, however, inferred that the component (B) contributes to stabilize the heteropoly acid of the component (A) because the strong acidity of the component (B) promotes the adsorption of such reactive substances as methacrolein on the catalyst and consequently exalts the activity of the catalyst and further because the component (B) possesses a large surface area and moreover excels in resistance to heat. It should be noted, however, that this invention is not restricted by such theoretical consideration as mentioned above.

Now, this invention will be more specifically described below with reference to working examples. The terms "conversion", "selectivity", and "per pass yield" are defined as follows.

Conversion (%)=[(Number of mols of raw material compound consumed in the reaction)/(Number of mols of raw material compound fed to the reaction)] (×100)

Selectivity (%)=[(Number of mols of methacrylic acid formed)/(Number of mols of raw material compound consumed in the reaction)] (×100)

Per pass yield =[(Number of mols of methacrylic acid formed)/(Number of mols of raw material compound fed to the reaction)] (×100)

EXAMPLE 1

Preparation of catalyst:
Component (A)

In 8 liters of heated deionized water, 1,766 g of ammonium paramolybdate and 106 g of ammonium metavanadate were placed and stirred until dissolution. In the resultant solution, 105 g of phosphoric acid (85% by weight) and 16.5 g of arsenious acid were placed and then a solution of 162 g of cesium nitrate in 2 liters of deionized water was added and they were stirred and heated for concentration. The resultant slurry was dried at 250° C. for 15 hours and then pulverized to obtain a powder (hereinafter referred to as "Powder (A-1)").

Component (B)

In deionized water, 270 g of zirconium oxychloride was wholly dissolved. The solution was kept stirred and aqua ammonia was gradually added thereto to give rise to zirconium hydroxide. The formed zirconium hydroxide was separated by filtration, washed thoroughly with deionized water, and then dried at 100° C. for 24 hours. The dry hydroxide was spread on a funnel (filter paper) and sulfuric acid separately prepared at a concentration of 0.25 mol was caused to flow in 10 split portions on the spread hydroxide while kept suctioned so as to effect thorough expulsion of an excess of the sulfate ion solution by aspiration. The hydroxide was dried and then calcined in a stream of air at 500° C. for three hours to obtain $SO_4/ZrO_2$ super acid powder having acid strength of −14.5 (hereinafter referred to as "Powder (B-1)").

A catalyst (1) was obtained by thoroughly mixing 1,720 g of the powder (A-1) (as oxide) with 104 g of the powder (B-1) (as oxide), molding the resultant mixture with water as a molding auxiliary to obtain pellets 6 mm in outside diameter and 6.6 mm in length, drying the pellets, and calcining the dried pellets under a stream of air at 400° C. for three hours. The ratio of the powder (B-1) to the powder (A-1) (as oxide) was 6.1% by weight. The composition of elements of this catalyst by atomic ratio (excluding oxygen; invariably applicable hereinafter) was as follows.

$$Mo_{12}P_{1.09}As_{0.2}V_{1.09}Cs_{1.0}\text{-}(Zr_{1.0}S_{0.02})$$

Oxidation reaction:

A reaction vessel of steel 25.4 mm in diameter was packed with 1500 ml of the catalyst (1). A mixed gas having the following average composition and obtained by the vapor-phase catalytic oxidation of isobutylene at 340° C. in the presence of a molybdenum-cobalt-tungsten-iron oxide multielement type system was introduced into the reaction vessel at a reaction temperature of 280° C. and a space velocity of 1,200 hr$^{-1}$ (STP) to be oxidized therein. The results were as shown in Table 1.

Average composition of mixed gas (vol%):

Methacrolein 3.5, isobutylene 0.04, (methacrylic acid +acetic acid) 0.24, steam 20, oxygen 9.0, and others (inert gas formed mainly of nitrogen and carbon dioxide) 67.22.

Control 1

Preparation of catalyst:

A catalyst (2) was prepared by following the procedure of Example 1 while using the powder (A-1) exclusively.

Oxidation reaction:

The oxidation reaction was carried out by following the procedure of Example 1 while using the catalyst (2) in place of the catalyst (1). The results were as shown in Table 1.

Comparison of Example 1 and Control 1 reveals that the catalyst (1) of this invention excels the catalyst (2) for comparison in catalytic activity.

EXAMPLE 2

Preparation of catalyst:

A catalyst (3) was obtained by adding 104 g of the powder (B-1) (as oxide) to the powder (A-1) while the latter powder was in a slurry form in the process of preparation, drying the resultant mixture at 250° C. for 15 hours, and thereafter following the procedure of Example 1, i.e. molding the dry mixture with water used as a molding auxiliary thereby forming pellets 6 mm in outside diameter and 6.6 mm in length, drying the pellets, and then calcining the dry pellets under a stream of air at 400° C. for 3 hours. The composition of elements of this catalyst (3) and the ratio of the powder (B-1) the powder (A-1) were equal to those of the catalyst (1).

Oxidation reaction:

The oxidation reaction was carried out by following the procedure of Example 1 while using the catalyst (3) in place of the catalyst (1). The results were as shown in Table 1.

EXAMPLE 3

Preparation of catalyst:

A catalyst (4) was obtained by following the procedure of Example 1 while adding the powder (B-1) in advance to the deionized water to which ammonium paramolybdate and ammonium metavanadate were added during the preparation of the powder (A-1). The composition of elements of this catalyst (4) and the ratio of the powder (B-1) to the powder (A-1) (as oxide) were identical to those of the catalyst (1).

Oxidation reaction:

The oxidation reaction was carried out by following the procedure of Example 1 while using the catalyst (4) in place of the catalyst (1). The results were as shown in Table 1.

Examples 1 through 3 varied the time for adding the powder (B-1) to the powder (A-1) or its precursor; the addition was made to the powder (A-1) which was still in the powdery form (Example 1), to the powder (A) which was in the slurry form (Example 2), and to the powder (A) which was not yet transformed into a slurry (Example 3). In all these examples, the addition of the powder (B-1) invariably realized improvement of activity without any decrease of the selectivity to methacrylic acid.

EXAMPLE 4

In the procedure of Example 2, the oxidation reaction was continued for 4,000 hours. The results after the 4,000 hours were as shown in Table 1.

It is remarked from the results of Table 1 that after 4000 hours' oxidation reaction, the decline of activity was very small and the decline of yield was practically negligible and that the use of the catalyst (3) of this invention enabled the oxidation reaction to continue highly stably for a long time.

Control 2

An oxidation reaction was carried out by following the procedure of Example 4 while using the catalyst (2) in place of the catalyst (3). The results were as shown in Table 1.

Comparison of Example 4 and Control 2 reveals that the catalyst (3) of this invention showed a small decline of activity and yield even after a protracted reaction, whereas the catalyst (2) for comparison showed a large decline in activity and yield and betrayed deficiency in stability.

EXAMPLE 5

An oxidation reaction was carried out by following the procedure of Example 2 while the reaction temperature and the space velocity were changed to 290° C. and 1,500 hr$^{-1}$ respectively. The results were as shown in Table 1.

Control 3

An oxidation reaction was carried out by following the procedure of Example 5 while using the catalyst (2) in place of the catalyst (3). The results were as shown in Table 1.

Comparison of Example 5 and Control 3 reveals that the catalyst (3) of this invention excelled the catalyst (2) for comparison in both activity and yield even under the condition of a high space velocity.

EXAMPLE 6

An oxidation reaction was carried out by following the procedure of Example 2 while changing the ratios of methacrolein and inert gas in the raw material gas respectively to 4.0% by volume and 66.72% by volume. The results were as shown in Table 1.

Control 4

An oxidation reaction was carried out by following the procedure of Example 6 while using the catalyst (2) in place of the catalyst (3). The results were as shown in Table 1.

Comparison of Example 6 and Control 4 reveals that the activity and yield of the catalyst (3) were both excellent even when the methacrolein concentration in the raw material gas was increased.

TABLE 1

| | Catalyst No. | Reaction temperature (°C.) | Conversion of methacrolein (mol %) | Selectivity of methacrylic acid (mol %) | Per pass yield of methacrylic acid (mol %) |
|---|---|---|---|---|---|
| Example 1 | (1) | 280 | 88.3 | 79.4 | 70.1 |
| Control 1 | (2) | 280 | 83.6 | 79.3 | 66.3 |
| Example 2 | (3) | 280 | 88.6 | 79.2 | 70.2 |
| Example 3 | (4) | 280 | 88.8 | 79.1 | 70.2 |
| Example 4 | (3) | 280 | 85.8 | 79.6 | 68.3 |
| Control 2 | (2) | 280 | 74.9 | 79.0 | 59.2 |
| Example 5 | (3) | 290 | 89.2 | 79.1 | 70.6 |
| Control 3 | (2) | 290 | 83.9 | 79.2 | 66.4 |
| Example 6 | (3) | 280 | 89.9 | 79.2 | 71.2 |
| Control 4 | (2) | 280 | 83.8 | 78.1 | 65.4 |

EXAMPLE 7

An oxidation reaction was carried out by following the procedure of Example 2 while using as a raw material gas a mixed gas comprising of 5% by volume of isobutyl aldehyde, 12.5% by volume of oxygen, 10% by volume of steam, and 72.5% by volume of nitrogen and changing the space velocity and the reaction temperature respectively to 800 hr$^{-1}$ and 270° C. The results were as shown in Table 2.

Control 5

An oxidation reaction was carried out by following the procedure of Example 7 while using the catalyst (2) in place of the catalyst (3). The results were as shown in Table 2.

TABLE 2

| | Catalyst No. | Reaction temperature (°C.) | Conversion of isobutyl aldehyde (mol %) | Selectivity of methacrylic acid (mol %) | Selectivity of methacrolein (mol %) | Per pass yield of methacrylic acid (mol %) |
|---|---|---|---|---|---|---|
| Example 7 | (3) | 270 | 100 | 65.7 | 12.8 | 65.7 |
| Control 5 | (2) | 270 | 100 | 61.6 | 13.6 | 61.6 |

EXAMPLE 8

An oxidation reaction was carried out by following the procedure of Example 2 while using as a raw material gas a mixed gas comprising 5% by volume of isobutyric acid, 10% by volume of oxygen, 10% by volume of steam and 75% by volume of nitrogen and changing the space velocity and the reaction temperature respectively to 2,000 hr$^{-1}$ and 270° C. The results were as shown in Table 3.

Control 6

An oxidation reaction was carried out by following the procedure of Example 8 while using the catalyst (2) in place of the catalyst (3). The results were as shown in Table 3.

EXAMPLE 9

Preparation of catalyst:

A catalyst (5) was prepared by following the procedure of Example 2 while changing the mixing ratio of the powder (B-1) to the powder (A-1) (as oxide) to 12.2% by weight. The composition of elements of this catalyst (5) in atomic ratio was as follows.

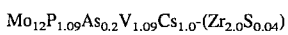

$Mo_{12}P_{1.09}As_{0.2}V_{1.09}Cs_{1.0}\text{-}(Zr_{2.0}S_{0.04})$

Oxidation reaction:

An oxidation reaction was carried out by following the procedure of Example 1 while using the catalyst (5) in place of the catalyst (1). The results were as shown in Table 4.

EXAMPLE 10

Preparation of catalyst:

A $SO_4/TiO_2$ super acid powder having acid strength of −13.8 (hereinafter referred to as "Powder (B-10)") was prepared by following the procedure for the preparation of the powder (B-1) in Example 1 while using titanium tetrachloride in place of zirconium oxychloride and changing the calcination temperature to 520° C. Then, a catalyst (6) was prepared by following the procedure of Example 2 while

TABLE 3

| | Catalyst No. | Reaction temperature (°C.) | Conversion of isobutyric acid (mol %) | Selectivity of methacrylic acid (mol %) | Per pass yield of methacrylic acid (mol %) |
|---|---|---|---|---|---|
| Example 8 | (3) | 270 | 98.6 | 78.6 | 77.5 |
| Control 6 | (2) | 270 | 95.8 | 75.3 | 72.1 | using the powder (B-10) in place of the powder (B-1). The ratio of the powder (B-10) to the powder (A-1) was 4.0% by weight. The composition of elements of this catalyst (6) in atomic ratio was as follows.

$$Mo_{12}P_{1.09}As_{0.2}V_{1.09}Cs_{1.0}\text{-}(Ti_{1.0}S_{0.02})$$

Oxidation reaction:

An oxidation reaction was carried out by following the procedure of Example 1 while using the catalyst (6) in place of the catalyst (1). The results were as shown in Table 4.

EXAMPLE 11

Preparation of catalyst:

A $SO_4/SnO_2$ super acid powder having acid strength of −14.5 (hereinafter referred to as "Powder (B-11)") was prepared by following the procedure used for the preparation of the powder (B-1) in Example 1 while using stannic chloride in place of zirconium oxychloride and changing the calcining temperature to 550° C. Then, a catalyst (7) was prepared by following the procedure of Example 2 while using the powder (B-11) in place of the powder (B-1). The ratio of the powder (B-11) to the powder (A-1) (as oxide) was 7.4% by weight. The composition of elements of this catalyst (7) in atomic ratio was as follows.

$$Mo_{12}P_{1.09}As_{0.2}V_{1.09}Cs_{1.0}\text{-}(Sn_{1.0}S_{0.02})$$

Oxidation reaction:

An oxidation reaction was carried out by following the procedure of Example 1 while using the catalyst (7) in place of the catalyst (1). The results were as shown in Table 4.

EXAMPLE 12

Preparation of catalyst:

A $SO_4/HfO_2$ super acid powder having acid strength of −13.2 (hereinafter referred to as "Powder (B-12)") was prepared by following the procedure used for the preparation of the powder (B-1) in Example 1 while using hafnium chloride in place of zirconium oxychloride and changing the calcination temperature to 650° C. Then, a catalyst (8) was prepared by following the procedure of Example 2 while using the powder (B-12) in place of the powder (B-1). The ratio of the powder (B-12) to the powder (A-1) (as oxide) was 10.3% by weight. The composition of elements of this catalyst (8) in atomic ratio was as follows.

$$Mo_{12}P_{1.09}As_{0.2}V_{1.09}Cs_{1.0}\text{-}(Hf_{1.0}S_{0.02})$$

Oxidation reaction:

An oxidation reaction was carried out by following the procedure of Example 1 while using the catalyst (8) in place of the catalyst (1). The results were as shown in Table 4.

EXAMPLE 13

Preparation of catalyst:

A $SO_4/Fe_2O_3$ super acid powder having acid strength of −12.7 (hereinafter referred to as "Powder (B-13)") was prepared by following the procedure used for the preparation of the powder (B-1) in Example 1 while using iron chloride in place of zirconium oxychloride. Then, a catalyst (9) was prepared by following the procedure of Example 2 while using the powder (B-13) in place of the powder (B-1). The ratio of the powder (B-13) to the powder (A-1) (as oxide) was 3.9% by weight. The composition of elements of this catalyst (9) in atomic ratio was as shown below.

$$Mo_{12}P_{1.09}As_{0.2}V_{1.09}Cs_{1.0}\text{-}(Fe_{1.0}S_{0.01})$$

Oxidation reaction:

An oxidation reaction was carried out by following the procedure of Example 1 while using the catalyst (9) in place of the catalyst (1). The results were as shown in Table 4.

EXAMPLE 14

Preparation of catalyst:

Silica gel was obtained by dissolving 100 g of ethyl silicate in deionized water, adding several drops of concentrated nitric acid to the resultant solution, and stirring the mixture. This silica gel was dried at 100° C. then immersed in $SO_2Cl_2$, and calcined at 400° C. to obtain a $SO_4/SiO_2$ super acid powder having acid strength of −12.7 (hereinafter referred to as "Powder (B-14)"). Then, a catalyst (10) was prepared by following the procedure of Example 2 while using the powder (B-14) in place of the powder (B-1). The ratio of the powder (B-14) to the powder (A-1) (as oxide) was 3.0% by weight. The composition of elements of this catalyst (10) in atomic ratio was as shown below.

$$Mo_{12}P_{1.09}As_{0.2}V_{1.09}Cs_{1.0}\text{-}(Si_{1.0}S_{0.02})$$

Oxidation reaction:

An oxidation reaction was carried out by following the procedure of Example 1 while using the catalyst (10) in place of the catalyst (1). The results were as shown in Table 4.

EXAMPLE 15

Preparation of catalyst:

A $SO_4/Al_2O_3$ super acid powder having acid strength of −13.8 (hereinafter referred to as "Powder (B-15)") was obtained by combining γ-alumina with 5N sulfuric acid and calcining the resultant mixture at 600° C. Then, a catalyst (11) was prepared by following the procedure of Example 2 while using the powder (B-15) in place of the powder (B-1). The ratio of the powder (B-15) to the powder (A-1) was 2.6% by weight. The composition of elements of this catalyst (11) in atomic ratio was as follows.

$$Mo_{12}P_{1.09}As_{0.2}V_{1.09}Cs_{1.0}\text{-}(Al_{1.0}S_{0.02})$$

Oxidation reaction:

An oxidation reaction was carried out by following the procedure of Example 1 while using the catalyst (11) in place of the catalyst (1). The results were as shown in Table 4.

EXAMPLE 16

Preparation of catalyst:

A $WO_3/ZrO_2$ super acid powder having acid strength of −13.8 (hereinafter referred to as "Powder (B-16)") was prepared by following the procedure used for the preparation of the powder (B-1) in Example 1 while using an aqueous solution of ammonium metatungstate in place of the aqueous sulfuric acid solution. Then, a catalyst (12) was prepared by following the procedure of Example 2 while using the powder (B-16) in place of the powder (B-1). The ratio of the powder (B-16) to the powder (A-1) (as oxide) was 7.7% by weight. The composition of elements of this catalyst (12) in atomic ratio was as shown below. The amount of $WO_3$ deposited on $ZrO_2$ was 28.2% by weight.

$$Mo_{12}P_{1.09}As_{0.2}V_{1.09}Cs_{1.0}\text{-}(Zr_{1.0}W_{0.15})$$

Oxidation reaction:

An oxidation reaction was carried out by following the procedure of Example 1 while using the catalyst (12) in place of the catalyst (1). The results were as shown in Table 4.

EXAMPLE 17

A $MoO_3/ZrO_2$ super acid powder having acid strength of $-12.7$ (hereinafter referred to as "Powder (B-17)") was prepared by following the procedure of Example 16 while using an aqueous solution of ammonium paramolybdate in place of the aqueous solution of ammonium metatungstate. Then, a catalyst (13) was prepared by following the procedure of Example 2 while using the powder (B-17) in place of the powder (B-1). The ratio of the powder (B-17) to the powder (A-1) (as oxide) was 6.7% by weight. The composition of elements of this catalyst (13) in atomic ratio was as shown below. The amount of $MoO_3$ deposited on $ZrO_2$ was 11.7% by weight.

$Mo_{12}P_{1.09}As_{0.2}V_{1.09}Cs_{1.0}\text{-}Zr_{1.0}Mo_{0.10})$

Oxidation reaction:

An oxidation reaction was carried out by following the procedure of Example 1 while using the catalyst (13) in place of the catalyst (1). The results were as shown in Table 4.

EXAMPLE 18

Preparation of catalyst:

A $WO_3/SnO_2$ super acid powder having acid strength of $-12.0$ (hereinafter referred to as "Powder (B-18)") was prepared by following the procedure used for the preparation of the powder (B-1) in Example 1 while using dry tin hydroxide in place of dry zirconium hydroxide and an aqueous solution of ammonium metatungstate in place of the aqueous solution of sulfuric acid and changing the calcination temperature to 900° C. Then, a catalyst was prepared by following the procedure of Example 2 while using the powder (B-18) in place of the powder (B-1). The ratio of the powder (B-18) to the powder (A-1) (as oxide) was 8.8% by weight. The composition of elements of this catalyst (14) in atomic ratio was as follows. The amount of $WO_3$ deposited on $SnO_2$ was 20.0% by weight.

$Mo_{12}P_{1.09}As_{0.2}V_{1.09}Cs_{1.0}\text{-}(Sn_{1.0}V_{0.13})$

Oxidation reaction:

An oxidation reaction was carried out by following the procedure of Example 1 while using the catalyst (14) in place of the catalyst (1). The results were as shown in Table 4.

EXAMPLE 19

Preparation of catalyst.

A $WO_3/TiO_2$ super acid powder having acid strength of $-12.4$ (hereinafter referred to as "Powder (B-19)") was prepared by following the procedure used for the preparation of the powder (B-1) in Example 1 while using dry titanium hydroxide in place of dry zirconium hydroxide and an aqueous solution of ammonium metatungstate in place of the aqueous solution of sulfuric acid and changing the calcination temperature to 700° C. Then, a catalyst (15) was prepared by following the procedure of Example 2 while using the powder (B-19) in place of the powder (B-1). The ratio of the powder (B-19) to the powder (A-1) (as oxide) was 5.1% by weight. The composition of elements of this catalyst (15) in atomic ratio was as follows. The amount of $WO_3$ deposited on $TiO_2$ was 32.0% by weight.

$Mo_{12}P_{1.09}As_{0.2}V_{1.09}Cs_{1.0}\text{-}(Ti_{1.0}W_{0.11})$

Oxidation reaction:

An oxidation reaction was carried out by following the procedure of Example 1 while using the catalyst (15) in place of the catalyst (1). The results were as shown in Table 4.

EXAMPLE 20

Preparation of catalyst:

A $WO_3/F_2O_3$ super acid powder having acid strength of $-12.0$ (hereinafter referred to as "Powder (B-20)") was prepared by following the procedure used for the preparation of the powder (B-1) in Example 1 while using dry iron hydroxide in place of dry zirconium hydroxide and an aqueous solution of ammonium metatungstate in place of the aqueous solution of sulfuric acid and changing the calcination temperature to 700° C. Then, a catalyst (16) was prepared by following the procedure of Example 2 while using the powder (B-20) in place of the powder (B-1). The ratio of the powder (B-20) to the powder (A-1) (as oxide) was 5.3% by weight. The composition of elements of this catalyst (16) in atomic ratio was as shown below. The amount of $WO_3$ deposited on $Fe_2O_3$ was 37.7% by weight.

$Mo_{12}P_{1.09}As_{0.2}V_{1.09}Cs_{1.0}\text{-}(Fe_{1.0}W_{0.13})$

Oxidation reaction:

An oxidation reaction was carried out by following the procedure of Example 1 while using the catalyst (16) in place of the catalyst (1). The results were as shown in Table 4.

EXAMPLE 21

Preparation of catalyst:

A compound of the following composition (excluding oxygen) was prepared by dissolving phosphotungstic acid in deionized water and adding the resultant solution to an aqueous solution obtained in advance by dissolving cesium nitrate in deionized water.

$Cs_{2.5}H_{0.5}P_1W_{12}$

A cesium phosphotungstate super acid powder having acid strength of $-12.4$ (hereinafter referred to as "Powder (B-21)") was obtained by calcining the compound at 400° C. Then, a catalyst (17) was prepared by following the procedure of Example 2 while using the powder (B-21) in place of the powder (B-1). The ratio of the powder (B-21) to the powder (A-1) (as oxide) was 15.6% by weight. The composition of elements of this catalyst (17) in atomic ratio was as follows.

$Mo_{12}P_{1.09}As_{0.2}V_{1.09}Cs_{1.0}\text{-}(Cs_{2.5}H_{0.5}P_1W_{12})_{0.1}$ Oxidation reaction:

An oxidation reaction was carried out by following the procedure of Example 1 while using the catalyst (17) in place of the catalyst (1). The results were as shown in Table 4.

TABLE 4

|  | Catalyst No. | Reaction temperature (°C.) | Conversion of methacrolein (mol %) | Selectivity of methacrylic acid (mol %) | Per pass yield of methacrylic acid (mol %) |
|---|---|---|---|---|---|
| Example 9  | (5)  | 280 | 89.0 | 79.2 | 70.5 |
| Example 10 | (6)  | 280 | 87.4 | 79.6 | 69.0 |
| Example 11 | (7)  | 280 | 88.2 | 79.4 | 70.0 |
| Example 12 | (8)  | 280 | 87.1 | 79.0 | 68.8 |
| Example 13 | (9)  | 280 | 87.2 | 79.3 | 69.1 |
| Example 14 | (10) | 280 | 87.2 | 79.3 | 69.1 |
| Example 15 | (11) | 280 | 87.3 | 79.5 | 69.4 |
| Example 16 | (12) | 280 | 87.1 | 79.5 | 69.2 |
| Example 17 | (13) | 280 | 86.7 | 79.6 | 68.7 |
| Example 18 | (14) | 280 | 86.6 | 79.6 | 68.9 |
| Example 19 | (15) | 280 | 86.7 | 79.3 | 68.8 |
| Example 20 | (16) | 280 | 86.5 | 79.4 | 68.7 |
| Example 21 | (17) | 280 | 86.3 | 79.2 | 68.3 |

EXAMPLE 22

Preparation of catalyst:

In 6 liters of water, 1766 g of ammonium molybdate was dissolved. Separately, 86.5 g of 85 wt % orthophosphoric acid was diluted with 450 ml of water and 54.5 g of copper nitrate and 37.1 g of arsenious acid were dissolved therein. The resultant mixed solution was added to the aforementioned aqueous ammonium molybdate solution and then heated and thoroughly stirred to be aged.

Separately, 86.5 g of 85 wt % orthophosphoric acid was diluted with 450 ml of water and 68.3 g of vanadium pentoxide was added thereto. When the resultant mixed solution was heated and stirred for gradual evaporation, a yellow complex was obtained. This complex was added to a reaction precipitate of phosphorus, molybdenum, copper, and arsenic. Finally, the produced mixture and a solution of 42.1 g of potassium hydroxide in 450 ml of water added thereto were stirred and heated for concentration. A powder (hereinafter referred to as "Powder (A-22)") was obtained by drying the resultant slurry at 250° C. for 15 hours.

A catalyst (18) was obtained by adding the powder (B-1) of Example 1 to the powder (A-22), thoroughly mixing them, and then treating the resultant mixture by following the procedure of Example 1. The composition of elements of this catalyst (18) in atomic ratio was as follows. The ratio of the powder (B-1) to the powder (A-22) (as oxide) was 6.0% by weight.

$Mo_{12}P_2As_{0.5}V_1K_1Cu_{0.3}$-$(Zr_{1.0}S_{0.02})$

Oxidation reaction:

An oxidation reaction was carried out by following the procedure of Example 1 while using the catalyst (18) in place of the catalyst (1) and changing the reaction temperature to 290° C. The results were as shown in Table 5.

Control 7

Preparation of catalyst:

A catalyst (19) was prepared by following the procedure of Example 22 while using the powder (A-22) exclusively.

Oxidation reaction:

An oxidation reaction was carried out by following the procedure of Example 22 while using the catalyst (19) in place of the catalyst (18). The results were as shown in Table 5.

EXAMPLE 23

Preparation of catalyst:

To a solution of 1,883 g of ammonium molybdate in 3.5 liters of purified water, 184.6 g of 85% phosphoric acid was added, then a solution of 312.1 g of cesium nitrate in 1.2 liters of water was added, further 194.5 g of bismuth nitrate and 64.8 g of antimony pentoxide were added in their powdery form, and finally a solution of 40.0 g of chromic anhydride and 44.4 g of selenium dioxide in 1.2 liters of water was added. They were stirred and heated for concentration. The slurry consequently obtained was dried at 250° C. for 15 hours and then pulverized to obtain a powder (hereinafter referred to as "Powder (A-23)").

This powder (A-23) and the powder (B-1) of Example 1 added thereto were thoroughly mixed. Then, a catalyst (20) was prepared by following the procedure of Example 1. The composition of elements of this catalyst (20) in atomic ratio was as shown below. The ratio of the powder (B-1) to the powder (A-23) (as oxide) was 5.1% by weight.

$Mo_{12}P_2Bi_{0.5}Sb_{0.5}Cs_{2.0}Cr_{0.5}Se_{0.5}$-$(Zr_{1.0}S_{0.02})$

Oxidation reaction:

An oxidation reaction was carried out by following the procedure of Example 1 while using the catalyst (20) in place of the catalyst (1) and changing the reaction temperature to 290° C. The results were as shown in Table 5.

Control 8

Preparation of catalyst:

A catalyst (21) was prepared by following the procedure of Example 23 while using the powder (A-23) exclusively.

Oxidation reaction:

An oxidation reaction was carried out by following the procedure of Example 23 while using the catalyst (21) in place of the catalyst (20). The results were as shown in Table 5.

EXAMPLE 24

Preparation of catalyst:

In 13 liters of deionized water, 1,601 g of molybdenum trioxide, 84.3 g of vanadium pentoxide, 14.7 g of copper oxide, 14.8 g of iron oxide, 14.0 g of tin oxide, and 106.8 g of 85% orthophosphoric acid were dispersed. The dispersion was heated and stirred for about three hours and, with 5.2 g of potassium hydroxide added thereto, further refluxed for about three hours and stirred and heated for concentration. The slurry obtained consequently was dried at 250° C. for 15 hours and then pulverized to obtain a powder (hereinafter referred to as "Powder (A-24)"). This powder (A-24) and the powder (B-1) of Example 1 added thereto were thoroughly mixed. Then, a catalyst (22) was prepared by following the procedure of Example 1. The composition of elements of this catalyst (22) in atomic ratio was as shown below. The ratio of the powder (B-1) to the powder (A-24) (as oxide) was 6.4% by weight.

$$Mo_{12}P_1V_1K_{0.1}Cu_{0.2}Fe_{0.2}Sn_{0.1}\text{-}(Zr_{1.0}S_{0.02})$$

Oxidation reaction:

An oxidation reaction was carried out by following the procedure of Example 1 while using the catalyst (22) in place of the catalyst (1) and changing the reaction temperature to 300° C. The results were as shown in Table 5.

Control 9

Preparation of catalyst:

A catalyst (23) was prepared by following the procedure of Example 24 while using the powder (A-24) exclusively.

Oxidation reaction:

An oxidation reaction was carried out by following the procedure of Example 24 while using the catalyst (23) in place of the catalyst (22). The results were as shown in Table 5.

EXAMPLE 25

Preparation of catalyst:

A powder (hereinafter referred to as "Powder (A-25)") was prepared by following the procedure of Example 1 while decreasing the amounts of the starting raw materials used in the preparation of the powder (A-1) in Example 1 each to one half and using 54.5 g of barium nitrate in place of cesium nitrate.

A catalyst (24) was prepared by adding this powder (A-25) to the powder (B-1) of Example 1, thoroughly mixing them, and then following the procedure of Example 1. The composition of elements of this catalyst (24) in atomic ratio was as shown below. The ratio of the powder (B-1) to the powder (A-25) (as oxide) was 6.3% by weight.

$$Mo_{12}P_{1.09}As_{0.2}V_{1.09}Ba_{0.5}\text{-}(Zr_{1.0}S_{0.02})$$

Oxidation reaction:

An oxidation reaction was carried out by following the procedure of Example 1 while using the catalyst (24) in place of the catalyst (1). The results were as shown in Table 5.

Control 10

Preparation of catalyst:

A catalyst (25) was prepared by following the procedure of Example 25 while using the powder (A-25) exclusively.

Oxidation reaction:

An oxidation reaction was carried out by following the procedure of Example 25 while using the catalyst (25) in place of the catalyst (24). The results were as shown in Table 5.

EXAMPLE 26

Preparation of catalyst:

A powder (hereinafter referred to as "Powder (A-26)") was prepared by following the procedure of Example 1 while adding 26.1 g of germanium oxide, 44.6 g of zirconium oxynitrate, and 24.3 g of cobalt nitrate in conjunction with 162.4 g of cesium nitrate in the preparation of the powder (A-1) in Example 1.

This powder (A-26) and the powder (B-1) of Example 1 added thereto were thoroughly mixed and then treated by following the procedure of Example 1 to prepare a catalyst (26). The composition of elements of this catalyst (26) in atomic ratio was as shown below. The ratio of the powder (B-1) to the powder (A-26) (as oxide) was 5.9% by weight.

$$Mo_{12}P_{1.09}As_{0.2}V_{1.09}Cs_{1.0}Ge_{0.3}Zr_{0.2}Co_{0.1}\text{-}(Zr_{1.0}S_{0.02})$$

Oxidation reaction:

An oxidation reaction was carried out by following the procedure of Example 1 while using the catalyst (26) in place of the catalyst (1). The results were as shown in Table 5.

Control 11

Preparation of catalyst:

A catalyst (27) was prepared by following the procedure of Example 26 while using the powder (A-26) exclusively.

Oxidation reaction:

An oxidation reaction was carried out by following the procedure of Example 26 while using the catalyst (27) in place of the catalyst (26). The results were as shown in Table 5.

EXAMPLE 27

Preparation of catalyst:

A powder (hereinafter referred to as "Powder (A-27)") was prepared by following the procedure of Example 1 while adding 39.9 g of tellurium dioxide, 47.8 g of manganese nitrate, and 48.5 g of nickel nitrate together with 162.4 g of cesium nitrate in the preparation of the powder (A-1) in

EXAMPLE 1.

This powder (A-27) and the powder (B-1) of Example 1 added thereto were thoroughly mixed and then treated by following the procedure of Example 1 to prepare a catalyst (28). The composition of elements of this catalyst (27) in atomic ratio was as shown below. The ratio of the powder (B-1) to the powder (A-27) (as oxide) was 5.8% by weight.

$$Mo_{12}P_{1.09}As_{0.2}V_{1.09}Cs_{1.0}Te_{0.3}Mn_{0.2}Ni_{0.2}\text{-}(Zr_{1.0}S_{0.02})$$

Oxidation reaction:

An oxidation reaction was carried out by following the procedure of Example 1 while using the catalyst (28) in place of the catalyst (1). The results were as shown in Table 5.

Control 12

Preparation of catalysts

A catalyst (29) was prepared by following the procedure of Example 27 while using the powder (A-27) exclusively.

Oxidation reaction:

An oxidation reaction was carried out by following the procedure of Example 27 while using the catalyst (29) in place of the catalyst (28). The results were as shown in Table 5.

EXAMPLE 28

Preparation of catalyst:

A powder (hereinafter referred to as "Powder (A-28)") was prepared by following the procedure of Example 1 while adding 112.6 g of ammonium tungstate, 49.6 g of zinc nitrate, and 14.2 g of silver nitrate together with 162.4 g of cesium nitrate in the preparation of the powder (A-1) in Example 1.

This powder (A-28) and the powder (B-1) of Example 1 added thereto were thoroughly mixed and then treated by following the procedure of Example 1 to prepare a catalyst (30). The composition of elements of this catalyst (30) in atomic ratio was as shown below. The ratio of the powder (B-1) to the powder (A-28) (as oxide) was 5.7% by weight.

$$Mo_{12}P_{1.09}As_{0.2}V_{1.09}Cs_{1.0}W_{0.5}Zn_{0.2}Ag_{0.1}\text{-}(Zr_{1.0}S_{0.02})$$

Oxidation reaction:
An oxidation reaction was carried out by following the procedure of Example 1 while using the catalyst (30) in place of the catalyst (1). The results were as shown in Table 5.
Control 13
Preparation of catalyst:
A catalyst (31) was prepared by following the procedure of Example 28 while using the powder (A-28) exclusively.
Oxidation reactions:
An oxidation reaction was carried out by following the procedure of Example 28 while using the catalyst (31) in place of the catalyst (30). The results were as shown in Table 5.

EXAMPLE 29

Preparation of catalyst:
A powder (hereinafter referred to as "Powder (A-29)") was prepared by following the procedure of Example 1 while adding 111.0 g of thallium nitrate, 33.2 g of niobium pentoxide, and 88.2 g of strontium nitrate together with 162.4 g of cesium nitrate in the preparation of the powder (A-1) in Example 1.
This powder (A-29) and the powder (B-1) of Example 1 added thereto were thoroughly mixed and then treated by following the procedure of Example 1 to prepare a catalyst (32). The composition of elements of this catalyst (32) in atomic ratio was as shown below. The ratio of the powder (B-1) to the powder (A-29) (as oxide) was 5.6% by weight.

$$Mo_{12}P_{1.09}As_{0.2}V_{1.09}Cs_{1.0}Tl_{0.5}Sr_{0.5}Nb_{0.3}Pd_{0.1}\text{-}(Zr_{1.0}S_{0.02})$$

Oxidation reaction:
An oxidation reaction was carried out by following the procedure of Example 1 while using the catalyst (32) in place of the catalyst (1) and changing the reaction temperature to 290° C. The results were as shown in Table 5.
Control 14
Preparation of catalyst:
A catalyst (33) was prepared by following the procedure of Example 29 while using the powder (A-29) exclusively.
Oxidation reaction:
An oxidation reaction was carried out by following the procedure of Example 29 while using the catalyst (33) in place of the catalyst (32). The results were as shown in Table 5.

EXAMPLE 30

Preparation of catalyst:
A powder (hereinafter referred to as "Powder (A-30)") was prepared by following the procedure of Example 1 while adding 61.4 g of rubidium nitrate, 39.4 g of calcium nitrate, and 27.1 g of rhodium nitrate together with 162.4 g of cesium nitrate in the preparation of the powder (A-1) in Example 1.

This powder (A-30) and the powder (B-1) of Example 1 added thereto were thoroughly mixed and then treated by following the procedure of Example 1 to prepare a catalyst (34). The composition of elements of this catalyst (34) in atomic ratio was as shown below. The ratio of the powder (B-1) to the powder (A-30) (as oxide) was 5.9% by weight.

$$Mo_{12}P_{1.09}As_{0.2}V_{1.09}Cs_{1.0}Rb_{0.5}Ca_{0.2}Rh_{0.1}\text{-}(Zr_{1.0}S_{0.02})$$

Oxidation reaction:
An oxidation reaction was carried out by following the procedure of Example 1 while using the catalyst (34) in place of the catalyst (1). The results were as shown in Table 5.
Control 15
Preparation of catalyst:
A catalyst (35) was prepared by following the procedure of Example 30 while using the powder (A-30) exclusively.
Oxidation reaction:
An oxidation reaction was carried out by following the procedure of Example 30 while using the catalyst (35) in place of the catalyst (34). The results were as shown in Table 5.

EXAMPLE 31

Preparation of catalysts
In 5 liters of water, 1,440 g of molybdenum trioxide, 75.8 g of vanadium pentoxide, and 144.2 g of 85% orthophosphoric acid were refluxed for 24 hours. In the resultant mixed solution, 71.7 g of powdery cerium oxide, 126.4 g of potassium nitrate, and 13.3 g of powdery copper oxide added thereto were stirred and heated for concentration. The resultant slurry was dried at 250° C. for 15 hours and pulverized to obtain a powder (hereinafter referred to as "Powder (A-31)"). This powder (A-31) and the powder (B-1) of Example 1 added thereto were thoroughly mixed and then treated by following the procedure of Example 1 to obtain a catalyst (36). The composition of elements of this catalyst (36) in atomic ratio was as follows. The ratio of the powder (B-1) to the powder (A-31) (as oxide) was 6.0% by weight.

$$Mo_{12}V_1P_{1.5}K_{1.5}Cu_{0.2}Ce_{0.5}\text{-}(Zr_{1.0}S_{0.02})$$

Oxidation reaction:
An oxidation reaction was carried out by following the procedure of Example 1 while using the catalyst (36) in place of the catalyst (1). The results were as shown in Table 5.
Control 16
Preparation of Catalyst:
A catalyst (37) was prepared by following the procedure of Example 31 while using the powder (A-31) exclusively.
Oxidation reaction:
An oxidation reaction was carried out by following the procedure of Example 31 while using the catalyst (37) in place of the catalyst (36). The results were as shown in Table 5.

TABLE 5

| | Catalyst No. | Reaction temperature (°C.) | Conversion of methacrolein (mol %) | Selectivity of methacrylic acid (mol %) | Per pass yield of methacrylic acid (mol %) |
|---|---|---|---|---|---|
| Example 22 | (18) | 290 | 87.4 | 76.0 | 66.4 |
| Control 7 | (19) | 290 | 82.5 | 76.2 | 62.9 |
| Example 23 | (20) | 290 | 83.3 | 73.8 | 61.5 |
| Control 8 | (21) | 290 | 78.1 | 73.7 | 57.6 |
| Example 24 | (22) | 300 | 85.5 | 71.8 | 61.4 |
| Control 9 | (23) | 300 | 80.4 | 71.8 | 57.7 |
| Example 25 | (24) | 280 | 88.5 | 78.9 | 69.8 |
| Control 10 | (25) | 280 | 83.5 | 78.7 | 65.7 |
| Example 26 | (26) | 280 | 87.7 | 74.1 | 65.0 |
| Control 11 | (27) | 280 | 82.9 | 74.3 | 61.6 |
| Example 27 | (28) | 280 | 85.2 | 77.9 | 66.4 |
| Control 12 | (29) | 280 | 80.3 | 77.9 | 62.6 |
| Example 28 | (30) | 280 | 86.4 | 78.0 | 67.4 |
| Control 13 | (31) | 280 | 81.7 | 77.9 | 63.6 |
| Example 29 | (32) | 290 | 83.8 | 74.2 | 62.2 |
| Control 14 | (33) | 290 | 78.7 | 74.3 | 58.5 |
| Example 30 | (34) | 290 | 84.0 | 74.1 | 62.2 |
| Control 15 | (35) | 290 | 78.8 | 74.0 | 58.3 |
| Example 31 | (36) | 290 | 91.3 | 73.5 | 67.1 |
| Control 16 | (37) | 290 | 87.1 | 73.9 | 64.4 |

What is claimed is:

1. A catalyst for producing methacrylic acid by the oxidation and/or oxidative dehydrogenation of at least one compound selected from the group consisting of methacrolein, isobutyl aldehyde, and isobutyric acid in a vapor phase with either molecular oxygen or a molecular oxygen-containing gas, which catalyst comprises (A) a composite oxide having molybdenum and phosphorus as essential components and adapted for the production of methacrylic acid by the vapor-phase catalytic oxidation and/or oxidative dehydrogenation of methacrolein, isobutyl aldehyde, and/or isobutyric acid and (B) a solid acid having acid strength, designated Ho, of not more than −11.93 (Ho≦−11.93).

2. A catalyst according to claim 1, wherein said component (A) is a composite oxide represented by the following general formula (1):

$Mo_aP_bA_cB_dC_eD_fO_x$ wherein Mo is molybdenum, P is phosphorus, A is at least one element selected from the group consisting or arsenic, antimony, germanium, bismuth, zirconium, cerium, and selenium, B is at least one element selected from the group consisting of copper iron, chromium, nickel, manganese, cobalt, tin, silver, zinc, palladium, rhodium, and tellurium, C is at least one element selected from the group consisting of vanadium, tungsten, and niobium, D is at least one element selected from the group consisting of alkali metals, alkaline earth metals, and thallium, O is oxygen, and a, b, c, d, e, f, and x represent atomic ratios respectively of Mo, P, A, B, C, D, and O such that b is a numeral in the range of 0.5 to 4, c in the range of 0 to 5, d in the range of 0 to 3, e in the range of 0 to 4, f in the range of 0.01 to 4, and x a numeral to be determined by the oxidized states of the relevant elements when a is fixed at 12.

3. A catalyst according to claim 1, wherein said component (B) is a super acid of SO$_4$/oxide of a metal of Group IV in the Periodic Table of Elements.

4. A catalyst according to claim 3, wherein said metal or Group IV in the Periodic Table of Elements is at least one member selected from the group consisting of zirconium, titanium, tin, and hafnium.

5. A catalyst according to claim 1, wherein said component (B) is a SO$_4$/iron oxide super acid.

6. A catalyst according to claim 1, wherein said component (B) is a SO$_4$/silicon oxide super acid.

7. A catalyst according to claim 1, wherein said component (B) is a SO$_4$/aluminum oxide super acid.

8. A catalyst according to claim 1, wherein said component (B) is a tungsten oxide, molybdenum oxide, or tungsten-molybdenum complex oxide/zirconium oxide super acid.

9. A catalyst according to claim 1, wherein said component (B) is a super acid of tungsten oxide/tin oxide, titanium oxide, iron oxide, or complex oxide of at least two elements selected from the group consisting of tin, titanium, and iron.

10. A catalyst according to claim 1, wherein said component (B) is a super acid of phosphotungstic acid and/or an alkali metal salt thereof.

11. A catalyst according to claim 1 wherein the weight of said component (B) lies in the range of 0.5 to 30% of the weight of component (A).

12. A method for the production of methacrylic acid by the vapor-phase catalytic oxidation and/or oxidative dehydrogenation of at least one compound selected from the group consisting of methacrolein, isobutyl aldehyde, and isobutyric acid in a vapor phase with a molecular oxygen-containing gas, which method comprises effecting said reaction in the presence of a catalyst for the production of methacrylic acid set forth claim 1.

* * * * *